Nov. 14, 1961 E. S. MOYER 3,008,548
TORQUE SENSITIVE BRAKE CONTROL
Filed Nov. 27, 1959 2 Sheets-Sheet 1
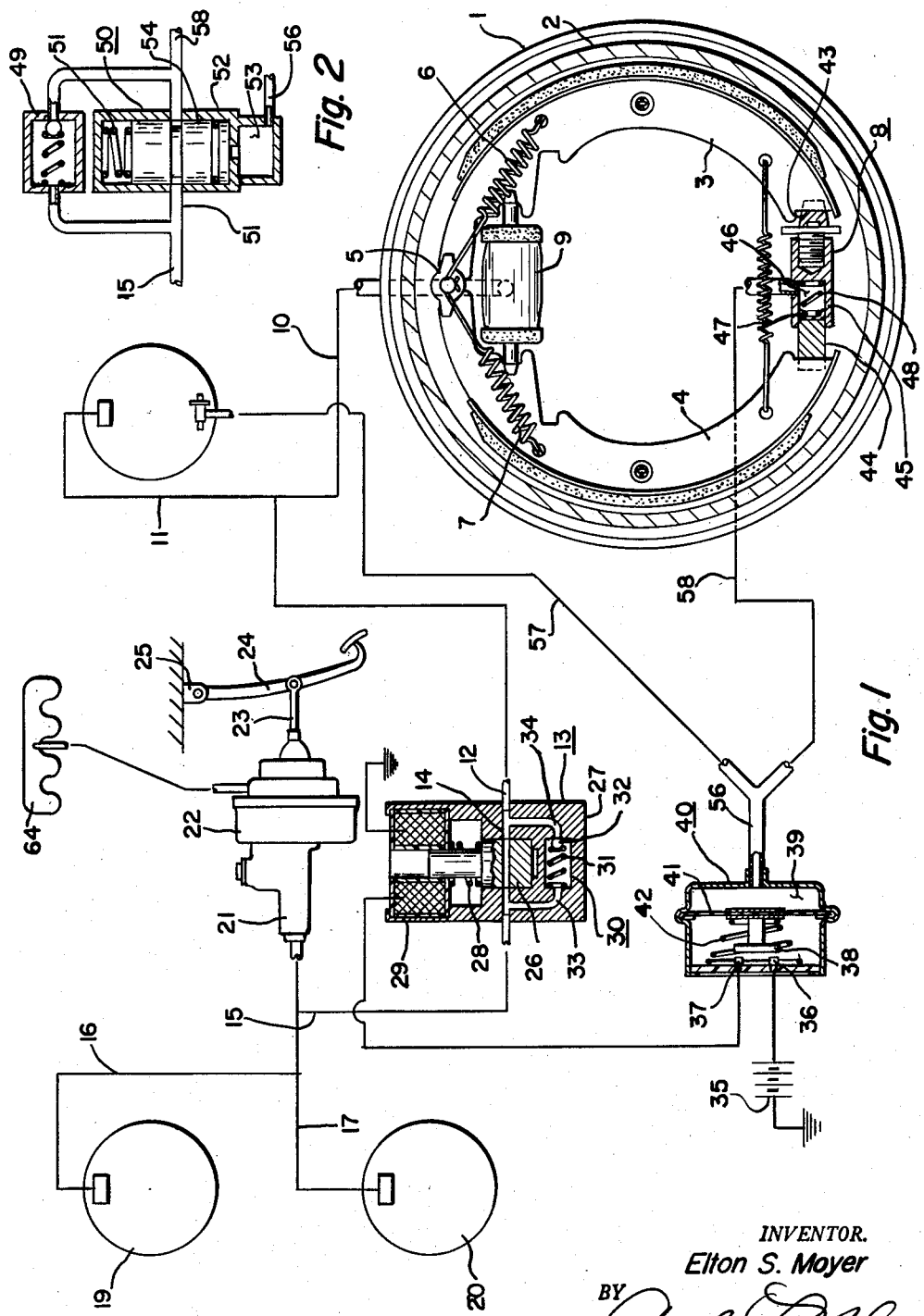
INVENTOR.
Elton S. Moyer
BY
His Attorney

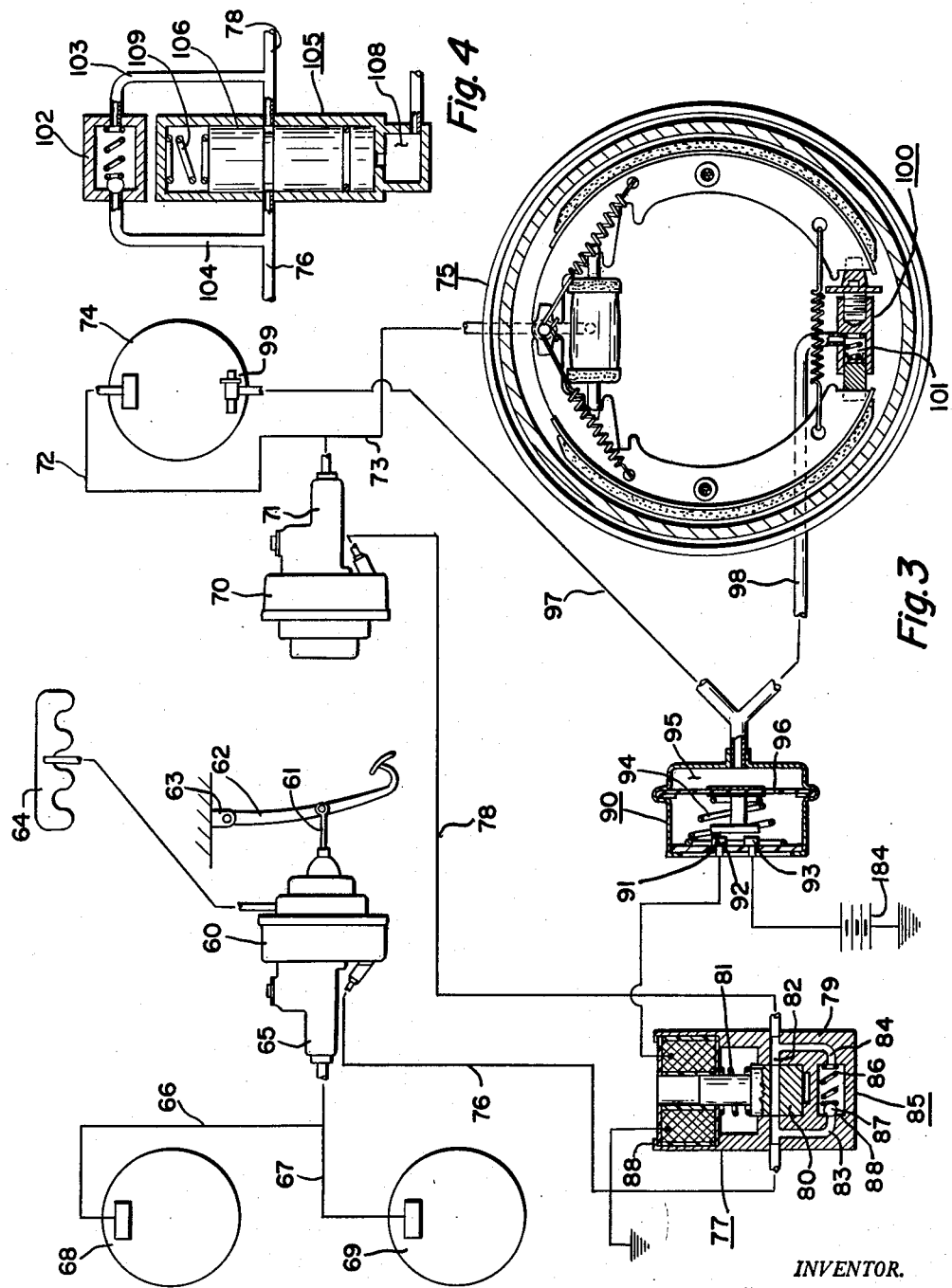

United States Patent Office 3,008,548
Patented Nov. 14, 1961

3,008,548
TORQUE SENSITIVE BRAKE CONTROL
Elton S. Moyer, Dayton, Ohio, assignor to General Motors Corporation, Detroit, Mich., a corporation of Delaware
Filed Nov. 27, 1959, Ser. No. 855,791
6 Claims. (Cl. 188—152)

This invention relates to a vehicle brake and more particularly to a torque sensitive control responsive to the torque output of the vehicle drum brake for controlling the braking effort on the rear wheel brakes.

As the vehicle is decelerated in response to braking the dynamic weight of the vehicle is thrown forwardly thereby requiring more braking effort on the front wheels and less braking on the rear wheels which is more in proportion to the dynamic weight distribution of the vehicle. For this reason it is desirable to provide a means for distributing the braking effort on the front and the rear wheels more in proportion to the dynamic loads on the vehicle wheels. Accordingly, this invention is intended to accomplish this result.

The output torque of the rear wheel brakes is transmitted through hydraulic means for actuating a valve control on the input line to the hydraulic fluid brake actuating system for the rear wheel brakes. This is accomplished by providing a valve in the brake fluid line leading to the rear wheel brakes which is controlled in response to the output torque on the rear wheel brakes. This may be accomplished hydraulically or through a hydraulic and electrical means.

It is an object of this invention to limit the braking effort on the rear wheels in response to the output torque of the rear wheels.

It is another object of this invention to provide a hydraulic strut operating between the brake shoes on the rear wheels brakes for transmitting a force to a control valve in the input line to the hydraulic rear brakes.

It is a further object of this invention to provide a hydraulic fluid means for controlling the input force to the rear wheel brakes in response to the output torque of the rear wheel brakes.

It is a further object of this invention to provide a fluid chamber in a connecting hydraulic strut between the rear wheel brake shoes for actuating a pressure switch to control a valve in the input line to the rear wheel brakes.

The objects of this invention are accomplished through a means for actuating the front wheel brakes including a single booster unit in the hydraulic fluid system. The rear wheel brakes are also operated by a vacuum booster and a hydraulic fluid system for actuation of the rear wheel brakes. A vacuum control valve is placed in the conduit means leading between the front booster unit and the rear booster unit. This vacuum control valve is controlled in response to the output braking torque of the rear wheel brakes. The output torque is sensed by a hydraulic strut positioned between two of the rear brake shoes for pressurizing fluid to actuate the control valve in the vacuum conduit. In this manner the rear wheel brakes cut off at a certain point dependent upon the torque of the rear wheel brakes. A modification provides an electrical means employing a pressure switch and a solenoid for actuation of the control valve in the vacuum conduit.

A still further modification of this idea is wherein a single booster unit is employed to actuate the front wheel brakes and the rear wheel brakes. A control valve is placed in the hydraulic conduit means leading to the rear wheel brakes which is controlled in response to the torque output on the rear wheel brakes. The torque output in this modification is sensed by a hydraulic strut connected to a fluid chamber to operate the hydraulic control valve in the fluid conduit of the fluid brake actuating system of the rear wheel brakes. This version also employs a pressure switch and a solenoid in place of the direct actuation by the hydraulic fluid. In both cases the output torque of the rear wheel brakes is the means for providing the control of the input fluid for actuation of the rear wheel brakes.

Further objects and advantages of the present invention will be apparent from the following description, reference being had to the accompanying drawings wherein preferred embodiments of the present invention are clearly shown.

In the drawings:

FIGURE 1 is a schematic view wherein a single booster unit is employed for actuating the vehicle brakes and the torque sensitive control valve is placed in the hydraulic conduit means leading to the rear wheels.

FIGURE 2 is a modification disclosing a hydraulically operated valve in the hydraulic fluid brake actuating system.

FIGURE 3 is a schematic diagram employing a solenoid control valve operating in response to the torque output of the rear wheel brakes. In this version dual booster units are employed.

FIGURE 4 is a modification wherein the control valve in a hydraulic line to the rear wheel brakes is operated directly by hydraulic fluid from the hydraulic fluid strut.

FIGURE 1 is a schematic diagram showing the operation of the front wheel brakes and the rear wheel brakes. One of the rear wheel drum brakes is shown in an enlarged portion to illustrate the functioning of the rear wheel brake and the torque sensing hydraulic strut. The control valve controlling fluid to the rear wheel brake actuating means is also shown enlarged to more clearly show the operation of the control means.

The backing plate 1 provides a mounting means for the braking structure. The brake drum 2 is mounted concentric with the backing plate for rotation relative to the backing plate. The brake shoes 3 and 4 are mounted within the brake drum for frictionally engaging the inner periphery of the drum 2. Two of the cooperative ends are biased to a contacting position against the anchor pin 5 by means of the retraction springs 6 and 7. The opposite two cooperative adjacent ends of the brake shoes contact a hydraulic strut 8. The brake shoes are actuated by means of the hydraulic wheel cylinder 9. The hydraulic wheel cylinder 9 is in communication with the hydraulic fluid brake actuating system including the conduits 10 and 11 leading to the conduit 12 and the control valve 13. A conduit 12 leads into the passage 14 within the control valve 13. The passage 14 is in communication with the conduits 15, 16 and 17 for actuation of the front wheel brakes 19 and 20. Fluid is pressurized within the master cylinder 21 by means of the booster unit 22. The booster unit 22 is operated through the push rod 23 which is pivotally connected to the brake lever 24. The brake lever 24 is pivotally mounted on the chassis 25.

The flow of fluid through the passage 14 is controlled by the valve element 26 mounted within the housing 27 of the valve 13. The valve element 26 is biased to a position as shown by the spring 28. In this position the solenoid coil 29 is not energized.

A ball check valve 30 is also provided within the valve housing 27. The ball check valve includes a spring 31 for biasing the ball 32 against the seat 34 in the housing 27. In this manner fluid is permitted to return around the passage 14 when the vehicle brakes are released. The fluid, however, is not permitted to pass from the master cylinder 21 to the rear wheel brakes through the check valve. The fluid must pass through the passage 14 within the valve housing 27.

The ball check valve 30 connects the passages 33 and 34 to passage 14 in bypassing the valve 13. The valve 13 is operated by the solenoid coil 29 which is electrically connected to the battery 35. The battery 35 is connected to the coil 29 through the contacts 36 and 37 and the plate 38 when the fluid is pressurized within the chamber 39.

The switch assembly 40 includes a diaphragm 41 for providing a closed chamber 39 for the actuating fluid from the hydraulic strut 8. The diaphragm 41 is biased to a position whereby the plate 38 is in spaced relation to the contacts 36 and 37 by means of the spring 42. As the fluid is pressurized within the chamber 39 the diaphragm moves to the left carrying the plate 38 and contacting the contacts 36 and 37 thereby closing the electrical circuit.

The hydraulic strut 8 is mounted between cooperative adjacent ends of the brake shoes 3 and 4. An adjusting screw 43 is provided on one end of the strut 8 to provide adjustment for the brakes. The opposite end of the strut is provided with a piston 44 for reception within the sleeve 45 of the strut 8. The sleeve 45 and piston 44 provide a pressurizing chamber 46 within the strut. This chamber receives the seal 47 and the spring 48 which biases the strut to an extended position. The opposite end of the piston 44 has a bifurcated portion for receiving the webbing of the brake shoe 4. The chamber 46 is in communication with the chamber 39 of the switch assembly 40. In this manner when fluid is pressurized within the chamber 46 of the hydraulic strut 8 it pressurizes fluid in chamber 39 of the switch assembly for actuating the switch.

A modification of this device is shown in FIGURE 2. A check valve assembly 49 is shown bypassing the main valve assembly 50. The valve assembly 50 is biased to an open position by the spring 51 within the housing 52. The pressurizing chamber 53 is formed within a valve housing 52 and the lower end of the valve piston 54. As the fluid is pressurized within the chamber 53 the valve is moved upwardly thereby closing the passage 51 which is in communication with the conduits 12 and 15. Conduit 56 is in communication with the conduits 57 and 58 which lead directly to the corresponding hydraulic struts in the rear wheel brakes.

The modification illustrated in FIGURES 3 and 4 employs a dual booster unit for actuation of the vehicle brakes. The front booster unit 60 is operated by the push rod 61 which is pivotally connected to the brake lever 62. The brake lever 62 is pivotally connected to the chassis 63. The booster unit 60 is operated by the vacuum from the manifold 64.

The front booster 60 pressurizes fluid within the front master cylinder 65 through the fluid conduits 66 and 67 which are in communication with the hydraulic wheel cylinders for the front wheel brakes 68 and 69.

The rear wheel brakes are operated by the rear booster unit 70 which pressurizes fluid in the rear master cylinder 71 which is connected by the conduit means 72 and 73 to the rear wheel brakes 74 and 75. The conduit means 76 connects the front booster unit 60 to the vacuum valve 77. The vacuum conduit 78 connects the rear booster unit 70 to the vacuum valve 77.

The vacuum valve 77 includes the housing 79 enclosing the valve piston 80 which is spring biased to its lowest position by the spring 81. The passage 82 connects the conduits 76 and 78 through the valve 77. The shunting passages 83 and 84 connect the check valve 85 to passage 82 in the lower part of the valve housing 79. The check valve 85 includes a spring 86 biasing the ball 87 on its seat 88. The bypass valve presents further evacuation of the rear booster unit 70 when the valve 77 is closed. It also permits pressurization of the vacuum chamber in booster unit 70 once the front wheel brakes are released.

The valve 77 is operated by a solenoid coil 88. The coil 88 is connected in series with the battery 184. The solenoid coil 88 is controlled by the pressure switch 90. The pressure switch 90 includes the plate 91 and the contacts 92 and 93. The plate 91 is biased to an open position in spaced relation to the contacts 92 and 93 by means of the spring 94. A pressure chamber 95 is formed on the opposite side of the diaphragm 96 from the switch. The pressure chamber 95 is connected through the conduit means 97 and 98 to the hydraulic struts 99 and 100.

The rear brake 75 includes a pair of brake shoes for engaging the inner periphery of the brake drum. The rear brake as shown in FIGURE 3 is the same as shown in FIGURE 1 and the hydraulic strut operates in the same manner as previously described. The pressurization within the chamber 101 of the hydraulic strut 100 pressurizes fluid in chamber 95 of the control switch and thereby actuates the solenoid coil 88. In this manner the pressurization of fluid in the chamber 101 is in response to the degree of torque output of the brake 75 and thereby provides a predetermined torque output for controlling the solenoid valve 88 and the shutoff point of the passage 82 in the valve 77.

A modification of this version is also shown in FIGURE 4. FIGURE 4 shows a bypass valve 102 connected to the passages 103 and 104 which shunt the main valve 105. The main vacuum valve 105 includes a valve piston 106 spring biased to its position as shown by the spring 109. The hydraulic chamber 108 is in communication with the chamber 101 in the hydraulic strut of the rear brakes 75. The conduits 78 and 76 are in communication with the valve 105. The operation of this valve is in response to the torque output of the rear wheel brakes and controls the vacuum input to the rear booster unit 70.

The operation of this invention is described in the following paragraphs. As the brake pedal 24 is depressed the booster unit 22 is operated and fluid is pressurized within the master cylinder 21. With the pressurization in the master cylinder 21 the front wheel brakes 19 and 20 are actuated. The conduit 15 is also in communication with the front wheel brakes and leads through the valve 13. The valve 13 is normally in the open position whereby fluid is permitted to pass from the conduit 15 through passage 14 and conduit 12 to the rear wheel brakes. In this manner the rear wheel brakes are operated simultaneously with the front wheel brakes on the initial actuation of the vehicle brakes.

With an increased application of the brakes by further depressing the brake pedal 24 the fluid within the hydraulic fluid actuating system is further pressurized and the brake torque increases correspondingly on all the brakes. In this manner the fluid is pressurized within the chamber 46 of the fluid strut in the rear brake. The pressurization of fluid in the chamber 46 also pressurizes the fluid in the chamber 39 of the pressure switch 40. When a certain predetermined brake output is reached the torque of the rear brakes pressurizes the fluid in the chamber 46 to the degree whereby the diaphragm 41 and the plate 38 of the switch 40 moves axially. The plate engages the contacts 36 and 37 closing the electrical circuit of the battery 35 and the solenoid coil 29. As the solenoid coil 29 is energized the plunger moves upwardly carrying the valve piston 26 thereby closing passage 14. As the passage 14 is closed the fluid pressure in the rear hydraulic wheel cylinders is maintained at a constant level. The rear brakes maintain a constant braking effort so long as the valve 13 is closed. If the actuation of the vehicle brakes are increased all of the braking effort is provided on the front wheel brakes 19 and 20.

With the release of the brakes the pressure in the master cylinder 21 is also released and the fluid is permitted to flow through the bypass valve 30 around the passage 14. With the release in the pressure in the rear wheel cylinders the torque output is also released and the pressure switch 40 opens. With an open position of the pressure switch 40 the solenoid is de-energized and the valve 13 is again permitted to open. In this manner all of the brakes are again released.

The braking cycle for the modification as illustrated in FIGURE 2 is very similar to that as illustrated in FIGURE 1. The only difference being in the fact that the hydraulic struts directly actuate the hydraulic valve 50. The hydraulic valve 50 operates by pressurization in the fluid chamber 53 in response to the pressurization of fluid in chamber 46 of the rear wheel hydraulic struts. With the pressurization in chamber 53 of the hydraulic valve 50 the piston valve 54 moves upwardly thereby closing off the passage 51 in preventing further actuation of the rear wheel brakes.

With a release of the brakes the fluid pressure in the rear wheel brakes is permitted to release through the bypass valve 49 around the hydraulic valve 50. With the release of the fluid through the bypass valve the rear wheel brakes are released simultaneously with the front wheel brakes.

The operation of the device illustrated in FIGURE 3 is similar to that of the device illustrated in FIGURE 1 with the exception that the valve 77 is a vacuum valve and not a hydraulic valve. As the valve closes further evacuation of the vacuum chamber of the rear booster unit is prevented and thereby maintaining a constant braking effort of the rear wheels. The constant braking effort is maintained on the rear wheels while any increased braking effort is taken on the front wheels.

With the release of the front wheel brakes the rear wheel brakes are also released through the bypass valve 85. The valve operates in the same manner as the valve illustrated in FIGURE 1.

The hydraulic valve in FIGURE 4 also operates in a similar manner to that of the hydraulic valve in FIGURE 2, except that the valve controls the vacuum to the rear booster unit 70. With a predetermined torque present on the rear wheel brake the valve is closed by means of the pressurization in the hydraulic chamber 108.

With the release of the vehicle brakes the valve shown in FIGURE 4 permits the bypass of fluid through the check valve 102 thereby releasing the rear wheel brakes.

While the embodiments of the present invention as herein disclosed, constitute preferred forms, it is to be understood that other forms might be adopted.

What is claimed is as follows:

1. In a vehicle braking means comprising in combination, a front hydraulic fluid brake actuating system for the front wheel brakes, means for pressurizing fluid in said front hydraulic fluid brake actuating system, a rear hydraulic fluid brake actuating system for acuating rear wheel brakes, means for pressurizing fluid in said rear hydraulic fluid brake actuating system, a source of pressurized fluid connected to said means for actuating said front wheel brakes, conduit means connecting said means for actuating said front wheel brakes to said means for actuating said rear wheel brakes, a control valve controlling the actuation of said rear wheel brakes in said conduit means, a hydraulic control valve chamber in said control valve, a hydraulic strut positioned in said rear wheel brakes, a hydraulic chamber in said strut, a hydraulic conduit means connecting said hydraulic chamber in said hydraulic strut of said rear wheel brakes with said hydraulic control valve chamber for actuating said control valve thereby providing a predetermined maximum brake torque output on said rear wheel brakes when said vehicle brakes are actuated.

2. In a vehicle braking system comprising in combination, a front hydraulic fluid brake actuating system, a hydraulic cylinder in communication with said front hydraulic fluid brake actuating system, a manually operated front booster unit pressurizing fluid in said front master cylinder, a source of vacuum in communication with the vacuum chamber of said front booster unit, a rear booster unit, a rear hydraulic fluid brake actuating system, a rear hydraulic master cylinder in communication with said rear hydraulic fluid brake actuating system, said rear booster unit pressurizing fluid in said rear master cylinder, a vacuum conduit means connecting said vacuum chamber of said front booster unit with the vacuum chamber of said rear booster unit, a vacuum valve in said conduit means, at least one hydraulic strut in the rear brake, a fluid chamber in said strut pressurizing fluid in response to brake output of said rear wheel brakes, a pressure switch, a pressure chamber in said pressure switch in communication with said chamber of said hydraulic strut, a solenoid, a battery, electrical connectors connecting said battery with said solenoid and said pressure switch, a plunger connected to said valve normally in the open position, said contact switch operating said solenoid to close said vacuum valve in response to a predetermined output torque from said rear brakes thereby controlling the maximum output torque of said rear brakes when said vehicle brakes are actuated.

3. A vehicle braking device comprising in combination, a hydraulic fluid brake actuating system, means for pressurizing fluid in said brake actuating system, conduit means in said hydraulic fluid brake actuating system connecting said pressurizing means with the rear wheel brakes, a hydraulic fluid control valve in said conduit means, at least one rear wheel brake including, a connecting strut engaging two of the brake shoes, a fluid chamber in said strut, a fluid actuating chamber in said fluid control valve, hydraulic fluid means connecting said fluid chamber of said strut and said actuating chamber of said control valve to close said control valve in response to a predetermined pressure in said fluid chamber of said strut providing a cut-off point for brake actuating of said rear wheel brakes.

4. A vehicle braking device comprising in combination, a hydraulic fluid brake actuating system, means for pressurizing fluid in said hydraulic fluid brake actuating system, rear wheel brakes, hydraulic fluid conduit means in said brake actuating system connecting said pressurizing means with said rear wheel brakes, a pressure control valve in said conduit means including, a solenoid, a plunger operating within said solenoid, a valve connected to said plunger, a connecting strut in said rear wheel brakes, a pressure chamber in said connecting strut, a pressure switch means including a pressure chamber, a pressure switch operated by pressurization of fluid in said pressure chamber of said pressure switch, connecting conduit means connecting said pressure chamber in said strut with said pressure chamber in said pressure switch, an electrical circuit including a source of electrical energy, electrical connectors connecting the solenoid coil of said solenoid with said source of electrical energy to energize said coil and bias said plunger to close said control valve in response to energization of said pressure switch upon brake actuation providing a predetermined pressure of the pressurizing fluid responsive to brake torque of rear wheel brakes.

5. A vehicle braking device comprising in combination, a front hydraulic fluid brake actuating system, a front wheel booster unit, a master cylinder connected to said front brake booster unit in hydraulic fluid communication with said front hydraulic fluid brake actuating system for pressurization of fluid in said system, a source of vacuum, a variable pressure chamber in said front booster unit in communication with source of vacuum, a rear hydraulic fluid brake actuating system, a rear brake booster unit, a master cylinder connected to said rear brake booster in communication with said rear hydraulic fluid brake actuating system, a variable pressure chamber in said rear booster unit, an expansible fluid conduit means connecting said variable pressure chamber of said front booster unit with the variable pressure chamber with a rear booster unit, an expansible fluid control valve, rear vehicle drum brakes operated by said rear hydraulic fluid brake actuating system, each of said rear vehicle drum brakes including a connecting strut engaging the brake shoes, a fluid chamber in said strut, a fluid actuating chamber in said expansible fluid control valve, a valve element forming a part of said actuating chamber of said expansible fluid control valve, hydraulic fluid conduit means connecting said hydraulic fluid actuating chamber in said control valve with said actuating chamber of said connecting strut, said valve element biased to a closed position to provide cut-off of flow of expansible fluid to said variable pressure chamber of said rear booster unit in response to a predetermined pressure in said connecting strut subsequent to a predetermined torque out-put of said rear wheel brakes.

6. A vehicle braking device comprising in combination, a front wheel hydraulic fluid brake actuating system, a front booster unit, a master cylinder connected to said front booster unit, said master cylinder in communication with said front brake actuating system, a source of vacuum, a variable pressure chamber in said booster unit in communication with said source of vacuum, a rear hydraulic fluid brake actuating system, rear wheel brakes having fluid actuating means in communication with said rear hydraulic fluid brake actuating system, a strut in said rear wheel brake, a fluid chamber in said strut, a rear booster unit, a hydraulic master cylinder connected to said rear booster unit, said rear master cylinder operated by said rear booster unit and being in communication with said rear brake actuating system, an expansible fluid conduit means connecting the variable pressure chamber of said rear booster unit with the variable pressure chamber of said front booster unit, an expansible fluid control valve in said expansible fluid conduit means, said control valve including a solenoid means, a solenoid coil in said solenoid means, a solenoid core operating in said solenoid coil a valve connected to said solenoid core, a pressure response switch means including a hydraulic fluid pressurizing chamber, a pressure switch operated in response to the pressurizing fluid in said pressure chamber of said pressure switch means, conduit means connecting said pressure chamber in said pressure switch to said fluid chamber in said strut in said rear vehicle brakes, said strut engaging the brake shoes of said rear wheel brakes, an electrical circuit including, a source of electrical energy, said pressure switch, said solenoid coil, electrical conductors connecting the element of said electrical circuit, said pressure switch energizing said solenoid coil for closing of said control valve in response to a predetermined cut-off of maximum torque out-put of said rear wheel brake when said rear wheel brakes are actuated.

References Cited in the file of this patent
UNITED STATES PATENTS

| | | |
|---|---|---|
| 2,219,041 | Harvey | Oct. 22, 1940 |
| 2,257,628 | Wahlberg | Sept. 20, 1941 |
| 2,781,871 | Altekruse | Feb. 19, 1957 |
| 2,922,499 | Ingres | Jan. 26, 1960 |

FOREIGN PATENTS

| | | |
|---|---|---|
| 721,800 | Great Britain | Jan. 12, 1955 |